United States Patent Office 3,334,113
Patented Aug. 1, 1967

3,334,113
9b-PHENYL-1,2,3,9b-TETRAHYDRO-5H-IMIDAZO[2,1-a]ISOINDOL-5-ONES
William J. Houlihan, Mountain Lakes, N.J., assignor to Sandoz Inc., Hanover, N.J.
No Drawing. Filed Dec. 18, 1963, Ser. No. 331,372
7 Claims. (Cl. 260—309.7)

This invention is directed to compounds which have anti-inflammatory and anti-convulsive activity and thus may be used for either or both activities. The compounds are of particular interest because of their low toxicity.

Said compounds are of one of the basic structures

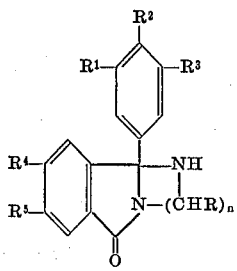

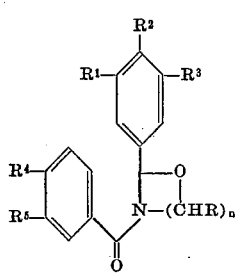

and

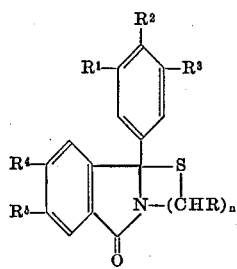

wherein
each R is independently either hydrogen or lower alkyl, e.g. methyl, ethyl, propyl and butyl;
each of $R^1$, $R^2$, $R^3$, $R^4$ and $R^5$ is independently either hydrogen, lower alkyl, e.g. methyl, ethyl, propyl and butyl; lower alkoxy, e.g. methoxy, ethoxy, propoxy and butoxy; amino; chlorine; bromine; fluorine or trifluoromethyl; with the proviso that neither $R^1$ nor $R^3$ is trifluoromethyl when $R^2$ is trifluoromethyl;
and $n$ is either 2, 3, or 4.

These structures, without noting the possible substituents, are of one of the types

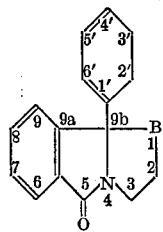

IV

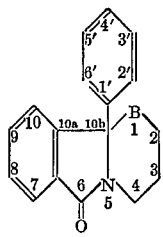

V and

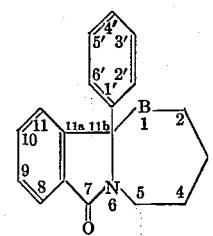

VI wherein B is either —NH—, —O— or —S—.

Compounds of structures I to VI are prepared (A) by reacting an o-benzoylbenzoyl chloride (a substance that can exist in tautomeric forms, such as VII and VIIa) with an ω-substituted primary amine and subsequently subjecting the product to ring closure according to the reaction scheme:

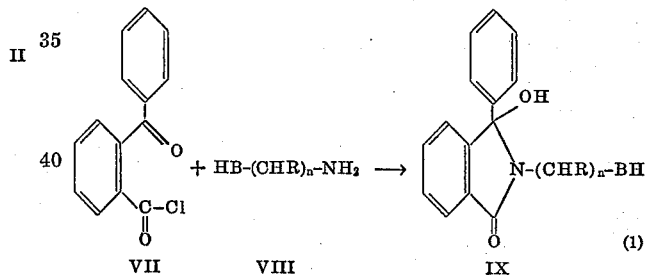

(1)

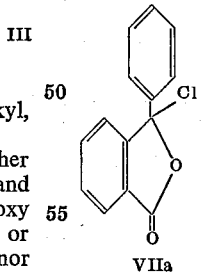

VIIa

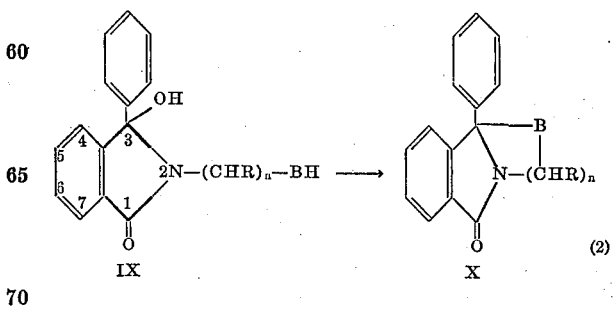

(2)

or (B) by reacting an o-benzoylbenzoic acid directly with an ω-substituted primary amine according to the reaction scheme:

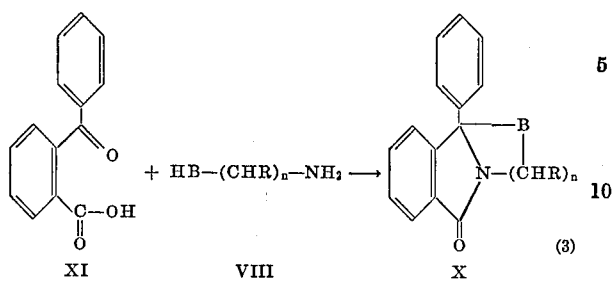

By a modification of (B) new intermediates XII are isolatable. This modification proceeds according to the reaction scheme:

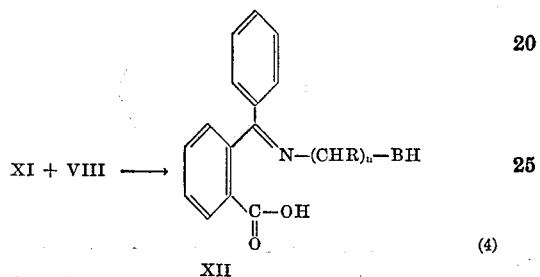

In each of the reaction schemes 1, 2, 3, and 4, B, R and n have the same meanings as previously indicated. Reaction 1 is carried out in a polar solvent (which is inert to the reactants and the reaction product IX) with or without an acid-binding agent, such as pyridine, alkylpyridine and quinoline. Suitable reaction temperatures are from room temperature, i.e. about 20° C., to the boiling point of the solvent employed. It is important to maintain the reaction medium at less than 5 percent by weight (based on the total weight of the amine reactant) of water. The reaction usually takes in excess of 6 hours.

Any polar solvent for the reactants may be used for reaction 1 as long as the solvent is inert to, i.e. does not react with, either the reactants or the reaction product. Examples of suitable solvents are: dimethylformamide, diethylformamide, dioxane chlorbenzene and pyridine.

The product IX of reaction 1 need not be isolated for reaction 2 which is also carried out in a solvent system. The solvent system for reaction 2 contains a catalytic amount of hydrogen ions.

In addition to the solvents contemplated for reaction 1, further solvents, such as benzene, alkylbenzenes, chlorbenzene, dichlorobenzene, cycloalkanes, tetralin or other high boiling hydrocarbons, are useful for reaction 2. This reaction is likewise conveniently carried out at a temperature from room temperature to the boiling point of the selected solvent system.

To provide a hydrogen ion source, either an organic or inorganic acid may be used. Para-toluenesulfonic acid is preferred, but other acids, such as alkane sulfonic, e.g. methane sulfonic; arylsulfonic, e.g. phenylsulfonic; phosphoric; acid ion exchange resin, e.g. "Dowex-50"; acid activated aluminosilicates, e.g. "Tonsil," also produce favorable results.

Reaction 3 is conducted in an inert solvent with or without a catalytic amount of hydrogen ions. The solvents are also the same as those indicated for reaction 2.

The intermediates IX for the preparation of compound III are of particular interest. These intermediates have the same substitution on the aromatic rings as noted for compounds III. The corresponding intermediates for compounds I and II are similarly substituted. Intermediates XII are likewise substituted. The latter are prepared by refluxing XI and VIII with toluene and a hydrogen ion source, such as above-exemplified. Intermediate XII is converted to X by refluxing in xylene with a hydrogen ion source.

As reactant VII, examples of suitable compounds are those of the formulae

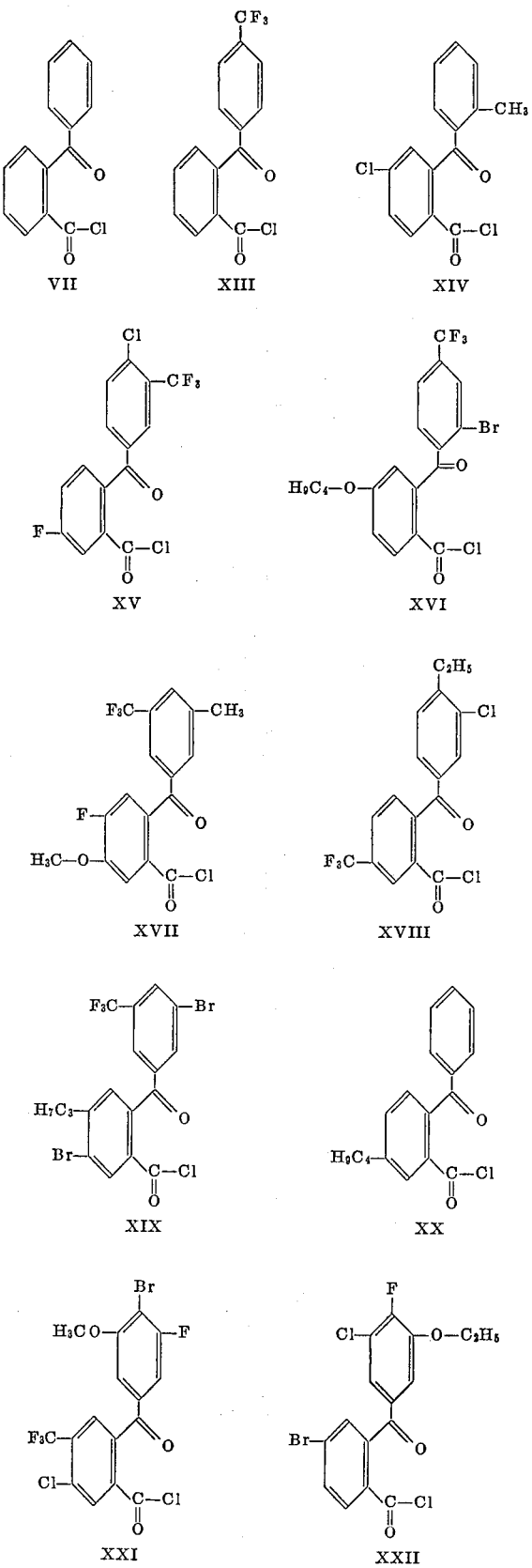

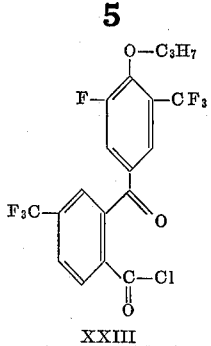

XXIII

Each of these compounds is prepared according to well known procedures.

Reactant VIII is a saturated acyclic hydrocarbon substituted with a primary amino group and either an —OH, an —SH, or a second —NH$_2$ group. The carbon chain connecting the primary amino group with the other substituent is from two to four carbons in length and may be further substituted with one or more lower alkyl, e.g. methyl, ethyl, propyl and butyl, groups. Any reactant VIII can be reacted (a) with reactant XI in reaction 3 and (b) with any reactant XI in reaction 4.

When B is sulfur, examples of reactant VIII are:

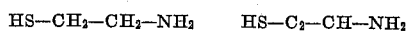

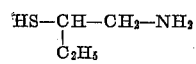   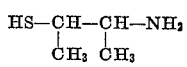

XXIV   XXV

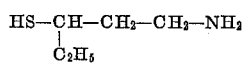   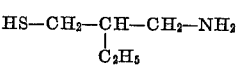

XXVI   XXVII

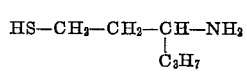   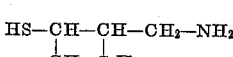

XXX   XXXI

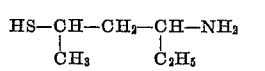   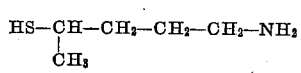

XXXII   XXXIV

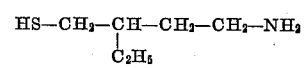

XXXV   XXXVI

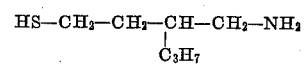

XXXVII

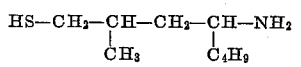

XXXVIII

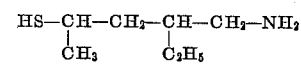

XXXIX

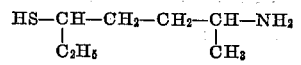

XL

HS—CH—CH$_2$—CH$_2$—CH—NH$_2$
   |                 |
  C$_2$H$_5$         CH$_3$

XLI

When B is either oxygen or —NH—, reactant VIII is exemplified as in Formulae XXIV to XLI with the corresponding changes.

Reactant XI is the free acid corresponding to reactant VII with respect to possible substitution. The preceding exemplification for reactant VII (see Formulae VII and XIII to XXIII) therefore applies equally as well to reactant XI. Reactant XI can either be made directly in a manner well known to the art or from the corresponding reactant VII.

The compounds of this invention (compounds of Formulae I to III) are useful in the alleviation of inflammation. For this purpose oral administration is suitable. Intraperitoneal administration affords protection against convulsions and/or death caused by convulsions. Both utilities are evidenced in white male albino mice. For oral administration dosages of 250 milligrams per kilogram of body weight were tolerated and were effective.

STRUCTURE I (a) 9b-phenyl-1,2,3,9b-tetrahydro-5H-imidazo[2,1-a]isoindol-5-ones These compounds have the ring structure

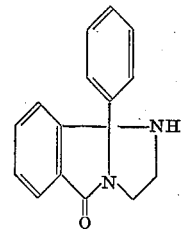

XLII and may be completely unsubstituted or contain selected substituents in particular positions. Any and/or all of the positions 2, 3, 7, 8, 2′, 3′, and 4′ may be substituted. Lower alkyl, preferably of from 1 to 4 carbon atoms, groups in either or both of the positions 2 and 3 do not adversely affect the therapeutic properties or the toxicity. Substitutions in the 7-, 8-, 2′-, 3′- and 4′-positions may be by any combination of lower alkyl, lower alkoxy, chlorine, bromine, fluorine and trifluoromethyl groups as long as there are not trifluoromethyl groups ortho to each other in the phenyl ring.

(b) 10b-phenyl-1,2,3,4-tetrahydropyrimido[2,1-a]isoindol-6(10bH)-ones

These compounds have the ring structure

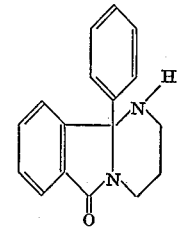

XLIII which may be unsubstituted or contain the same substituents as described for structure XLII in the same relative positions. The substitution in positions 2, 3 and 4 of XLIII may be the same as that provided for positions 2 and 3 of XLII.

(c) 11b-phenyl-1,2,3,4,5,11b-hexahydro-7H-[1,3]diazepino[2,1-a]isoindol-7-ones

These compounds have the ring structure

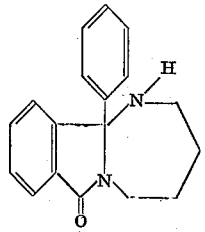

XLIV which also may either be unsubstituted or contain the same substituents as described for structure XLII in the same relative positions. The substitution in positions 2, 3, 4 and 5 of XLIV may be the same as that provided for positions 2 and 3 of XLII.

STRUCTURE II (a) 9b-phenyl-2,3-dihydrooxazolo[2,3-a]isoindol-5(9bH)-ones.
(b) 10b-phenyl-2,3,4,10b-tetrahydro-6H-[1,3]oxazino[2,3-a]isoindol-6-ones.
(c) 11b-phenyl-2,3,4,5-tetrahydro-[1,3]-oxazepino[2,3-a]isoindol-7(11bH)-ones.

The compounds of these structures correspond with respect to scope of substitution to the compounds of structures XLII, XLIII and XLIV, respectively, as described supra. The sole difference in structure is that the —NH— in the 1-position is replaced by —O—.

STRUCTURE III (a) 9b-phenyl-2,3-dihydrothiazolo[2,3-a]isoindol-5(9bH)-ones.
(b) 10b-phenyl-2,3,4,10b-tetrahydro-6H-[1,3]-thiazino[2,3-a]isoindol-6-ones.
(c) 11b-phenyl-2,3,4,5-tetrahydro-[1,3]-thiazepino[2,3-a]isoindol-7(11bH)-ones.

The compounds of these structures also correspond with respect to scope of substitution to the compounds of structures XLII, XLIII and XLIV, respectively, as described supra. The sole difference in structure is that the —NH— in the 1-position is replaced by —S—.

The examples which follow are merely illustrative of the invention. Any contemplated combination of substitution may be obtained in the same manner as hereinafter set forth by the corresponding selection of reactants. Compounds of structures I, II and III are prepared in the same manner with only an appropriate change in reactant VIII.

In said examples, unless otherwise specified, all parts are parts by weight, all temperatures are in degrees Centigrade and the relationship between parts by weight and parts by volume is the same as that between grams and cubic centimeters.

EXAMPLE 1

*2-(β-hydroxyethyl)-3-hydroxy-3-phenylisoindolone*

Charge a flask with 5.0 grams (g.) (0.082 mole) of ethanolamine, 10.0 g. (0.041 mole) of o-benzoylbenzoyl chloride, 0.2 milliliter (ml.) of pyridine and 50 ml. of dimethylformamide. Maintain at 60° C. for 2 days with continuous stirring. Remove the solvent. The oil residue solidifies on standing. Crystallize the resulting solid from methanol-water.

10.1 g. of 2-(β-hydroxyethyl)-3-hydroxy-3-phenylisoindolone is obtained in this way. The melting point (M.P.) is 124° to 126° C., and the yield is 87 percent, based on the o-benzoylbenzoyl chloride.

In this example and in subsequent examples the solvent removal is effected by means of a rotary evaporator. Either a water or a mechanical pump is employed, and the absolute pressure varies between 0.5 and 25 millimeters (mm.) of mercury (Hg). The temperature varies from room temperature to 80° C.

The stirring in each of the examples is not critical. The rate of stirring, type (e.g. mechanical or magnetic), position and size of stirrer are not critical to the reaction and may be extensively varied. The reaction is effected even without stirring altogether.

EXAMPLE 2

*9b-phenyl-2,3-dihydrooxazolo[2,3-a]isoindol-5(9bH)-one*

Admix 10.0 g. (0.037 mole) of 2-(β-hydroxyethyl)-3-hydroxy-3-phenylisoindolone (prepared according to Example 1) with 0.5 g. of p-toluenesulfonic acid and 150 ml. of dry toluene in a flask equipped with a Dean-Stark tube (a device for separating water from the condensate). Reflux until water fails to separate from the condensate. Remove the solvent in vacuo. Crystallize the resultant solid from methanol.

9.4 g. of 9b-phenyl-2,3-dihydrooxazolo[2,3-a]isoindol-5(9bH)-one, M.P. 240° to 245° C., are thus obtained. The yield is 100 percent based on the isoindolone starting material.

Examples 1 and 2 are exemplary of reactions (1) and (2), respectively, and illustrate the two-step method of obtaining the inventive final products. Instead of using compound VII as a starting material for Example 1, the same molar proportion of any of compounds XIII to XXIII is employed in the same way with corresponding results.

EXAMPLE 3a

*9b-(3'-amino-4'-chlorophenyl)-2,3-dihydrooxazolo[2,3-a]isoindol-5(9bH)-one*

Admix 6.9 g. (0.025 mole) of 2-carboxy-3'-amino-4'-chlorobenzophenone with 3.1 g. (0.10 mole) of ethanolamine, 100 ml. of toluene and 0.1 g. of p-toluenesulfonic acid in a flask equipped with a stirrer and a Dean-Stark tube. Stir and reflux until condensate fails to liberate water.

Remove solvent in vacuo, and crystallize the residue from methanol. 5.7 g. of 9b-(3'-amino-4'-chlorophenyl)-2,3-dihydrooxazolo[2,3-a]isoindol - 5(9bH) - one, M.P. 130° to 139° C., are thus obtained.

EXAMPLE 3b

*9b-(p-chlorophenyl)-2,3-dihydrooxazolo[2,3-a]isoindol-5(9bH)-one*

Admix 10.4 g. (0.04 mole) of o-(p-chlorobenzoyl)-benzoic acid with 3.7 g. (0.06 mole) of ethanolamine, 150 ml. of toluene and 0.5 g. of p-toluenesulfonic acid in a flask equipped with a stirrer and a Dean-Stark tube. Stir and reflux until condensate fails to liberate water. Remove the solvent in vacuo. Crystallize the residue from methanol-water.

6.5 g. of 9b - (p-chlorophenyl) - 2,3 - dihydrooxazolo[2,3-a]isoindol-5(9bH)-one, M.P. 71.5° to 74° C., are thus obtained.

Example 3 is exemplary of reaction 3, i.e. the one-step method of obtaining the final products of this invention. The one-step and the two-step methods are alternatives. Either and/or both can be employed to produce any of the contemplated final products from corresponding starting material.

EXAMPLE 4

*2-(γ-hydroxypropyl)-3-hydroxy-3-phenylisoindolone*

Admix 10 g. (0.13 mole) of 3-aminopropanol, 16.4 g. of o-benzoylbenzoyl chloride, 0.5 ml. of pyridine and 100 ml. of dimethylformamide and stir the resulting solution at 60° C. for two days. Remove the solvent in vacuo. Crystallize resulting solid from methanol-water.

17.4 g. of 2-(γ-hydroxypropyl)-3-hydroxy-3-phenylisoindolone, M.P. 115° to 117° C., are thus obtained. This represents a 92 percent yield based on the starting compound VII.

EXAMPLE 5

*10b-phenyl-2,3,4,10b-tetrahydro-6H-[1,3]oxazino[2,3-a]isoindol-6-one*

Admix 10.0 g. (0.035 mole) of 2-γ-hydroxypropyl)-3-hydroxy-3-phenylisoindolone (prepared according to Example 4) with 0.5 g. of p-toluenesulfonic acid in 150 ml. of dry toluene in a flask equipped with a Dean-Stark tube. Reflux until water fails to separate from the condensate. Remove the solvent in vacuo. Crystallize the residue from methanol-water.

8.2 g. of 10b-phenyl-2,3,4,10b-tetrahydro-6H-[1,3]oxazino[2,3-a]isoindol-6-one, M.P. 122° to 124° C., are thus obtained. This represents an 87 percent yield based on the starting isoindolone.

EXAMPLE 6

10b-phenyl-2,3,4,10b-tetrahydro-6H-[1,3]oxazino[2,3-a]isoindol-6-one

Admix 11.3 g. (0.05 mole) of o-benzoylbenzoic acid with 5.7 g. (0.075 mole) of 3-aminopropanol, 150 ml. of toluene and 0.1 g. of p-toluenesulfonic acid in a flask equipped with a stirrer and a Dean-Stark tube. Stir and reflux until condensate fails to liberate water. Remove the solvent in vacuo, leaving a viscous residue. Add methanol to the viscous residue to crystallize 9.8 g. of 10b - phenyl - 2,3,4,10b - tetrahydro - 6H - [1,3]oxazino [2,3-a]isoindol-6-one, M.P. 128° to 129° C.

The infrared spectrum of this product and that prepared from 1-phenyl-2-(γ-hydroxypropyl)-phthalamide are identical.

EXAMPLE 7

2(δ-hydroxybutyl)-3-hydroxy-3-phenylisoindolone

Admix 10.0 (0.11 mole) of 4 aminobutanol with 13.8 g. (0.056 mole) of o-benzoylbenzoyl chloride, 0.5 ml. pyridine and 100 ml. dimethylformamide at 60° C. for two days. Remove the solvent in vacuo, obtaining an oil residue. Shake the oil residue with 200 ml. of water for one hour to form a crystalline precipitate. Recrystallize from dimethylformamide-water.

16.2 g. of 2-(δ-hydroxybutyl)-3-hydroxy-3-phenylisoindolone, M.P. 150° to 152° C. are thus obtained. This represents a 97 percent yield based on the starting compound VII.

EXAMPLE 8

11b-phenyl-2,3,4,5-tetrahydro-[1,3]oxazepino[2,3-a]isoindol-7(11bH)-one

Admix 5.0 g. (0.017 mole) of 2-(δ-hydroxybutyl)-3-hydroxy-3-phenylisoindolone (prepared according to Example 7) with 0.75 g. of p-toluenesulfonic acid and 75 ml. of dry toluene in a flask with a stirrer and a Dean-Stark tube. Stir and reflux until water fails to separate. Remove the solvent in vacuo. Crystallize the residue from the methanol-water.

3.8 g. of 11b-phenyl-2,3,4,5-tetrahydro-[1,3]oxazepino [2,3-a]isoindol-7(11bH)-one, M.P. 133° to 134° C., are thus obtained. This represents an 80 percent yield based on the starting phenylisoindolone.

Examples 1 to 3 illustrate the preparation of compounds of Formula IV wherein B is oxygen. Examples 4 to 6 illustrate the preparation of compounds of Formula V wherein B is oxygen. Examples 7 and 8 illustrate the preparation of compounds of Formula VI wherein B is oxygen.

EXAMPLE 9

9b-phenyl-1,2,3,9b-tetrahydro-5H-imidazo[2,1-a]isoindol-5-one (a) Admix 11.3 g. (0.05 mole) o-benzoylbenzoic acid with 4.5 g. (0.075 mole) of ethylenediamine, 150 ml. of toluene and 0.1 g. of p-toluenesulfonic acid, in a flask equipped with a stirrer and a Dean-Stark tube. Stir and reflux until water fails to separate from the condensate. Remove the solvent in vacuo. Crystallize the residue from methanol-water.

6.8 g. of 9b-phenyl-1,2,3,9b-tetrahydro-5H-imidazo [2,1-a]isoindol-5-one, M.P. 151° to 153° C., are thus obtained.

(b) Admix 11.3 g. (0.05 mole) of o-benzoylbenzoic acid with 4.2 g. (0.07 mole) of ethylenediamine and 150 ml. of toluene in a flask equipped with a Dean-Stark tube and a stirrer. Stir and reflux until condensate fails to liberate water. Remove the solvent in vacuo. Crystallize the residue from methanol-water.

10.7 g. of 9b-phenyl-1,2,3,9b-tetrahydro-5H-imidazo-[2,1-a]isoindol-5-one, M.P. 151° to 152° C., are thus obtained.

Instead of using o-benzoylbenzoic acid as a starting material for this example a comparable amount of any acid corresponding to one of the compounds XIII to XXIII is employed with comparable results.

EXAMPLE 9c

9b-(p-chlorophenyl)-1,2,3,9b-tetrahydro-5H-imidazo[2,1-a]isoindol-5-one

Admix 10.4 g. (0.04 mole) of o-(p-chlorobenzoyl) benzoic acid with 3.6 g. (0.06 mole) of ethylenediamine, 150 ml. toluene and 0.5 g. of p-toluenesulfonic acid, in a flask equipped with a Dean-Stark tube. Stir and reflux until water fails to separate from the condensate. Remove the solvent in vacuo. Crystallize the residue from methanol-water.

5.2 g. of 9b-(p-chlorophenyl)-1,2,3,9b-tetrahydro-5H-imidazo[2,1-a]isoindol-5-one, M.P. 162° to 163° C., are thus obtained.

EXAMPLE 10a

10b-phenyl-1,2,3,4-tetrahydropyrimido[2,1-a]isoindol-6(10bH)-one

Admix 22.2 g. (0.10 mole) of o-benzoylbenzoic acid with 8.2 g. (0.11 mole) of 1,3-diaminopropane, 150 ml. of toluene and 1.1 g. of p-toluenesulfonic acid in a flask equipped with a stirrer and a Dean-Stark tube. Stir and reflux until water fails to separate. Remove the solvent in vacuo. Crystallize the residue from methanol.

19.4 g. of 10b - phenyl - 1,2,3,4 - tetrahydropyrimido [2,1-a]isoindol-6(10bH)-one, M.P. 181° to 183° C., are thus obtained.

EXAMPLE 10b

10b-(p-chlorophenyl)-1,2,3,4-tetrahydropyrimido[2,1-a]isoindol-6(10bH)-one

Admix 10.4 g. (0.04 mole) of o-(p-chlorobenzoyl)-benzoic acid with 4.44 g. (0.06 mole) of propylene diamine, 150 ml. of toluene and 0.5 g. of p-toluenesulfonic acid in a flask equipped with a Dean-Stark tube. Stir and reflux until water fails to separate from the condensate. Remove the solvent in vacuo. Crystallize the residue from methanol-water.

9.3 g. of 10b-(p-chlorophenyl)-1,2,3,4-tetrahydropyrimido [2,1-a]isoindol-6(10bH)-one M.P. 160° to 162° C. are thus obtained.

EXAMPLE 11a

N-(4-aminobutyl)-2-carboxybenzophenone imine

Admix 11.3 g. (0.05 mole) of o-benzoylbenzoic acid with 5.0 g. (0.057 mole) of 1,4-diaminobutane, 150 ml. of toluene and 0.6 g. of p-toluenesulfonic acid in a flask equipped with a Dean-Stark tube and a stirrer. Stir and reflux until condensate fails to liberate water. Remove the solvent in vacuo. Crystallize the residue from methano-ether. 8.5 g. of N-(4-aminobutyl)-2-carboxybenzophenone imine, M.P. 200° to 201° C., are thus obtained.

*Analysis.*—Calculated for $C_{18}H_{20}N_2O_2$: C, 72.9; H, 7.0; N, 9.4; O, 10.7. Found: C, 72.9; H, 7.0; N, 9.2; O, 11.2.

In a similar way all compounds of the formula

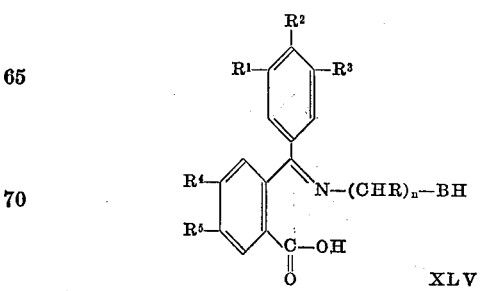

XLV wherein each of R, $R^1$, $R^2$, $R^3$, $R^4$, $R^5$, B and $n$ has the

EXAMPLE 11b

*11b-phenyl-1,2,3,4,5,11b-hexahydro-7H-[1,3]diazepino[2,1-a]isoindol-7-one*

Admix 7.4 of N-(4-aminobutyl)-2-carboxy benzophenone imine, 0.3 g. of p-toluenesulfonic acid and 250 ml. of xylene in a flask equipped with a Dean-Stark tube. Stir and reflux until condensate fails to liberate water. Remove the solvent in vacuo. Crystallize the residue from DMF-methanol-water. 5.9 g. of 11b-phenyl-1,2,3,4,5,11b-hexahydro - 7H - [1,3]diazepino[2,1-a] isoindol-7-one, M.P. 180° to 182° C., are thus obtained.

*Analysis.*—Calculated for $C_{18}H_{18}N_2O$: C, 77.7; H, 6.5; N, 10.1; O, 5.7. Found: C, 77.6; H, 6.8; N, 10.3; O, 6.0.

This example exemplifies reaction 4. In like manner every compound of Formulae I, II and III is prepared.

EXAMPLE 12

*9b-phenyl-2,3-dihydrothiazole[2,3a]isoindol-5-(9bH)-one*

Admix 6.3 g. (0.055 mole) of mercaptoethylamine hydrochloride with 12.3 g. (0.05 mole) of o-benzoylbenzoyl chloride, 7.9 g. (0.10 mole) of pyridine and 75 ml. of dimethylformamide at 60° C. for two days. Remove the solvent in vacuo. Transfer the resulting residue to a flask containing 150 ml. of toluene and 0.2 g. of p-toluenesulfonic acid and equipped with a stirrer and a Dean-Stark tube. Stir and reflux until the condensate fails to liberate water. Remove the solvent in vacuo. Crystallize the residue from methanol-water.

5.8 g. of 9b-phenyl-2,3-dihydrothiazolo[2,3-a]isoindol-5-(9bH)-one, M.P. 103° to 104° C., are thus obtained.

This example illustrates the two-step method for preparing compounds of Formula IV, wherein B is sulfur, without isolating and crystallizing the intermediate. Two-step methods for preparing any of the compounds of Formulae IV to VI can be similarly effected. Compounds of Formulae IV to VI, wherein B is sulfur, are prepared by the same methods as illustrated in Examples 1 to 8 for corresponding compounds, wherein B is oxygen.

In the preparation of said compounds wherein B is sulfur, any of the starting materials exemplified by Formulae XXIV to XLI is employed in place of the corresponding starting material illustrated in any of Examples 1 to 8. Also, corresponding oxygen- and nitrogen-containing amines are employed in the preparation of compounds of Formulae I and II.

It is thought that the invention will be understood from the foregoing description. Various changes may be made in processes, the intermediates and the final products without departing from the spirit and the scope of the invention or sacrificing its material advantages. The processes, the novel intermediates and the final products hereinbefore described are merely illustrative of preferred embodiments of the invention.

What is claimed is:

1. A compound of the formula

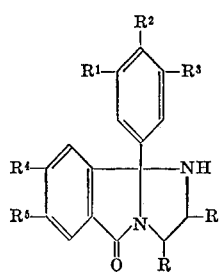

wherein each R is, independently, a member selected from the group consisting of a hydrogen atom and lower alkyl;

each of $R^1$, $R^3$, $R^4$ and $R^5$ is a member selected from the group consisting of a hydrogen atom, lower alkyl, lower alkoxy, amino, a chlorine atom, a bromine atom, a fluorine atom and trifluoromethyl; and $R^2$ is a member selected from the group consisting of a hydrogen atom, lower alkyl, lower alkoxy, amino, a chlorine atom, a bromine atom and a fluorine atom.

2. A compound of the formula

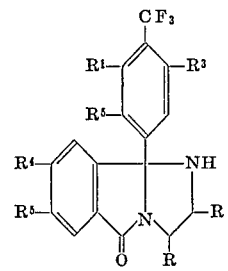

wherein each R is, independently, a member selected from the group consisting of a hydrogen atom and lower alkyl; and each of $R^1$, $R^3$, $R^4$ and $R^5$ is a member selected from the group consisting of a hydrogen atom, lower alkyl, lower alkoxy, amino, a chlorine atom, a bromine atom and a fluorine atom.

3. 9b-phenyl-1,2,3,9b-tetrahydro - 5H - imidazo[2,1-a]isoindol-5-one.

4. 9b - (p - chlorophenyl) - 1,2,3,9b - tetrahydro - 5H-imidazo[2,1-a]isoindol-5-one.

5. A process for preparing a 9b-phenyl-1,2,3,9b-tetrahydro-5H-imidazo[2,1-a]isoindol-5-one which comprises contacting an o-benzoylbenzoic acid, in an inert solvent, with a diamine of the formula $H_2N(CHR)_2NH_2$, wherein each R is, independently, hydrogen or lower alkyl, to form the corresponding N-[(CHR)$_2$NH$_2$] - 2 - carboxybenzophenone imine, wherein R is as defined above, and then cyclizing said imine by refluxing the same in said inert solvent.

6. A process of claim 5 wherein the diamine is ethylenediamine.

7. A process for preparing a compound selected from the group consisting of (1) a 9b-phenyl-1,2,3,9b-tetrahydro-5H-imidazo[2,1-a]isoindol-5-one, (2) a 10b-phenyl - 1,2,3,4 - tetrahydropyrimido[2,1-a]isoindol-6 (10bH)one, and (3) an 11b - phenyl-1,2,3,4,5,11b-hexahydro-7H-[1,3]diazepino[2,1-a]isoindol-7-one, which comprises contacting an o-benzoylbenzoic acid, in an inert solvent, with a diamine of the formula $H_2N(CHR)_nNH_2$, wherein each R is, independently, hydrogen or lower alkyl and $n$ represents 2, 3 or 4, to form the corresponding N-[(CHR)$_n$NH$_2$] - 2 - carboxybenzophenone imine, wherein R and $n$ are as defined above, and then cyclizing said imine by refluxing the same in said inert solvent.

References Cited

UNITED STATES PATENTS

| | | | |
|---|---|---|---|
| 2,857,396 | 10/1958 | Wheeler et al. | 260—325 |
| 2,957,885 | 10/1960 | Bortnick et al. | 260—309.6 |
| 2,989,537 | 6/1961 | Druey et al. | 260—309.7 |
| 3,091,568 | 5/1963 | Bub | 260—325 |

(Other references on following page)

FOREIGN PATENTS 211,831  11/1960  Austria.
671,043  9/1963  Canada.

OTHER REFERENCES

Betrabet et al., Chem. Abstracts, volume 25, pages 701–702 (1931).

Honzl, Col. Czech. Chem. Comm., volume 21, page 731 relied on (1956).

WALTER A. MODANCE Primary Examiner.

J. M. FORD, N. TROUSOF, Assistant Examiners.

UNITED STATES PATENT OFFICE
CERTIFICATE OF CORRECTION

Patent No. 3,334,113                      August 1, 1967

William J. Houlihan

It is hereby certified that error appears in the above numbered patent requiring correction and that the said Letters Patent should read as corrected below.

Column 12, lines 12 to 25, the formula should appear as shown below instead of as in the patent:

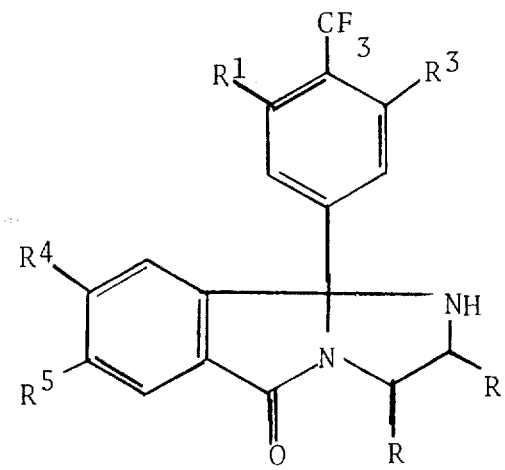

Signed and sealed this 29th day of October 1968.

(SEAL)
Attest:

EDWARD M. FLETCHER, JR.            EDWARD J. BRENNER
Attesting Officer                   Commissioner of Patents

Notice of Adverse Decision in Interference

In Interference No. 99,077 involving Patent No. 3,334,113, W. J. Houlihan, 9b-PHENYL-1,2,3,9b-TETRAHYDRO - 5H - IMIDAZO[2,1-a]ISOINDOL-5-ONES, final judgment adverse to the patentee was rendered Dec. 18, 1975, as to claims 3, 4, 5 and 6.

[*Official Gazette March 23, 1976.*]